United States Patent
Chandra et al.

(10) Patent No.: US 8,504,110 B2
(45) Date of Patent: Aug. 6, 2013

(54) METHOD AND APPARATUS FOR TRANSFERRING SMART ANTENNA CAPABILITY INFORMATION

(75) Inventors: Arty Chandra, Manhasset Hills, NY (US); Inhyok Cha, Melbourne, FL (US); Paul Marinier, Brossard (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 485 days.

(21) Appl. No.: 11/066,915

(22) Filed: Feb. 25, 2005

(65) Prior Publication Data
US 2006/0056316 A1    Mar. 16, 2006

Related U.S. Application Data

(60) Provisional application No. 60/609,132, filed on Sep. 10, 2004.

(51) Int. Cl.
*H04M 1/00* (2006.01)
(52) U.S. Cl.
USPC ............... 455/562.1; 455/575.7; 455/553.1; 455/561; 370/254; 370/329
(58) Field of Classification Search
USPC ................ 700/53; 370/334, 328, 338, 345, 370/346, 349, 449, 445; 455/562.1, 500, 455/550.1, 575.7, 553.1, 41.2, 507, 517
See application file for complete search history.

(56) References Cited

U.S. PATENT DOCUMENTS

| | | | |
|---|---|---|---|
| 6,229,486 B1 | 5/2001 | Krile |
| 6,438,389 B1 | 8/2002 | Sandhu et al. |
| 6,721,302 B1 | 4/2004 | Alastalo |
| 6,751,206 B1 | 6/2004 | Padovani et al. |
| 6,754,501 B1 | 6/2004 | McRae et al. |
| 6,768,747 B1 | 7/2004 | Dogan |
| 7,035,652 B1 | 4/2006 | Kelkar |

(Continued)

FOREIGN PATENT DOCUMENTS

| EP | 1 063 789 | 12/2000 |
|---|---|---|
| EP | 1063789 | 12/2000 |

(Continued)

OTHER PUBLICATIONS

IEEE Standard for Information Technology —Telecommunications and Information Exchange Between Systems—Local and Metropolitan Area Networks—Specific Requirements, Part 11: Wireless Medium Access Control (MAC) and Physical Layer (PHY) Specifications: Amendment 7: Medium Access Control (MAC) quality of Service (QoS) Enhancements, Aug. 2004.

(Continued)

*Primary Examiner* — Chuong A Ngo
(74) *Attorney, Agent, or Firm* — Volpe and Koenig, P.C.

(57) ABSTRACT

A system for exchanging smart antenna capability information between a transmitting station (STA) and a receiving STA in a wireless communication system includes an antenna capability information element (IE) that includes information regarding the capability of the transmitting STA. The antenna capability IE is sent from the transmitting STA to the receiving STA prior to data transmission between the transmitting STA and the receiving STA. When used in a wireless local area network, the antenna capability IE can be sent as part of a management frame, control frame, or data frame.

24 Claims, 3 Drawing Sheets

U.S. PATENT DOCUMENTS

| | | | |
|---|---|---|---|
| 7,075,902 | B2 | 7/2006 | El Batt |
| 7,286,515 | B2 * | 10/2007 | Olson et al. ............ 370/338 |
| 7,321,580 | B1 | 1/2008 | Ramanathan et al. |
| 7,471,963 | B2 | 12/2008 | Kim et al. |
| 2002/0083458 | A1 * | 6/2002 | Henderson et al. ........... 725/72 |
| 2002/0181492 | A1 | 12/2002 | Kasami et al. |
| 2002/0193146 | A1 * | 12/2002 | Wallace et al. ............ 455/562 |
| 2003/0033394 | A1 | 2/2003 | Stine |
| 2003/0123576 | A1 | 7/2003 | Cleveland et al. |
| 2003/0162567 | A1 | 8/2003 | Raghothaman et al. |
| 2003/0169769 | A1 * | 9/2003 | Ho et al. ............ 370/473 |
| 2003/0185241 | A1 * | 10/2003 | Lu et al. ............ 370/476 |
| 2003/0214905 | A1 * | 11/2003 | Solomon et al. ............ 370/229 |
| 2003/0221006 | A1 * | 11/2003 | Kuan et al. ............ 709/225 |
| 2003/0224797 | A1 | 12/2003 | Kuan et al. |
| 2003/0231715 | A1 | 12/2003 | Shoemake et al. |
| 2004/0004951 | A1 | 1/2004 | Zuniga et al. |
| 2004/0090938 | A1 | 5/2004 | Hsu |
| 2004/0100936 | A1 | 5/2004 | Liu et al. |
| 2004/0103282 | A1 | 5/2004 | Meier et al. |
| 2004/0114535 | A1 | 6/2004 | Hoffman et al. |
| 2004/0120292 | A1 | 6/2004 | Trainin |
| 2004/0143428 | A1 | 7/2004 | Rappaport et al. |
| 2004/0152458 | A1 | 8/2004 | Hottinen |
| 2004/0157604 | A1 | 8/2004 | Sharony et al. |
| 2004/0157637 | A1 | 8/2004 | Steer et al. |
| 2004/0160930 | A1 | 8/2004 | Choi et al. |
| 2004/0170140 | A1 | 9/2004 | Backes et al. |
| 2004/0170153 | A1 | 9/2004 | Stewart et al. |
| 2005/0037822 | A1 * | 2/2005 | Regnier et al. ............ 455/575.5 |
| 2005/0068928 | A1 * | 3/2005 | Smith et al. ............ 370/338 |
| 2005/0075140 | A1 | 4/2005 | Famolari |
| 2005/0085197 | A1 * | 4/2005 | Laroia et al. ............ 455/101 |
| 2005/0219137 | A1 * | 10/2005 | Heisen et al. ............ 343/776 |
| 2006/0025178 | A1 | 2/2006 | Tao et al. |
| 2006/0111103 | A1 * | 5/2006 | Jeong et al. ............ 455/434 |
| 2006/0164969 | A1 * | 7/2006 | Malik et al. ............ 370/203 |
| 2006/0292991 | A1 | 12/2006 | Abramov et al. |
| 2007/0054632 | A1 * | 3/2007 | Lu et al. ............ 455/101 |
| 2007/0274253 | A1 * | 11/2007 | Zhang et al. ............ 370/328 |
| 2008/0192683 | A1 | 8/2008 | Han et al. |

FOREIGN PATENT DOCUMENTS

| | | |
|---|---|---|
| EP | 1 187 506 | 3/2002 |
| EP | 1 330 050 | 7/2003 |
| EP | 1330050 | 7/2003 |
| JP | 2000-270024 | 9/2000 |
| JP | 2003-158479 | 5/2003 |
| WO | 03/023895 | 3/2003 |
| WO | 2004/042983 | 5/2004 |
| WO | 2005/089358 | 9/2005 |

OTHER PUBLICATIONS

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Spectrum and Transmit Power Management Exptensions in the 5GHz Band in Europe, Oct. 2003.

IEEE Wireless LAN Edition, A Compilation Based on IEEE Std. 802.11™-1999 (R2003) and its amendments, pp. 1-678.

IEEE Standard for Information Technology—Telecommunications and Information Exchange Between Systems—Local and Metroplitan Area Networks—Specific Requirements, Part 11: Wireless Medium Access Control (MAC) and Physical Layer (PHY) Specifications: Amendment 7: Medium Access Control (MAC) Quality of Service (QoS) Enhancements, Aug. 2004.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Spectrum and Transmit Power Management Extensions in the 5GHz Bank in Europe, Oct. 2003.

IEEE Wireless LAN Edition, A Compilation Based on IEEE Std. 802.11™ -1999 (R2003) and its amendments, pp. 1-678.

IEEE Wireless LAN Edition, A Compilation Based on IEEE Std. 802.11™—1999 (R2003) and its amendments, pp. 1-678.

Draft Amendment to Standard for Telecommunications and Information Exchange Between Systems—LAN/MAN Specific Requirements—Part 11: Wireless Medium Access Control (MAC) and Physical Layer (PHY) Specifications: Amendment 7: Radio Resource Measurement, Jul. 2004.

IEEE Standard for Information Technology—Telecommunications and Information Exchange Between Systems—Local and Metropolitan Area Networks—Specific Requirements, Part 11: Wireless Medium Access Control (MAC) and Physical Layer (PHY) Specifications: Amendment 7: Medium Access Control (MAC) Quality of Service (QoS) Enhancements, Aug. 2004.

IEEE Standard for Information Technology—Telecommunications and Information Exchange Between Systems—Local and Metropolitan Area Networks—Specific Requirements, Part 11: Wireless Lan Medium Access Control (MAC) and Physical Layer (PHY) Specifications, Amendment 5: Spectrum and Transmit Power Management Extensions in the 5GHz Band in Europe, Oct. 2003.

Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Jun. 2003.

* cited by examiner

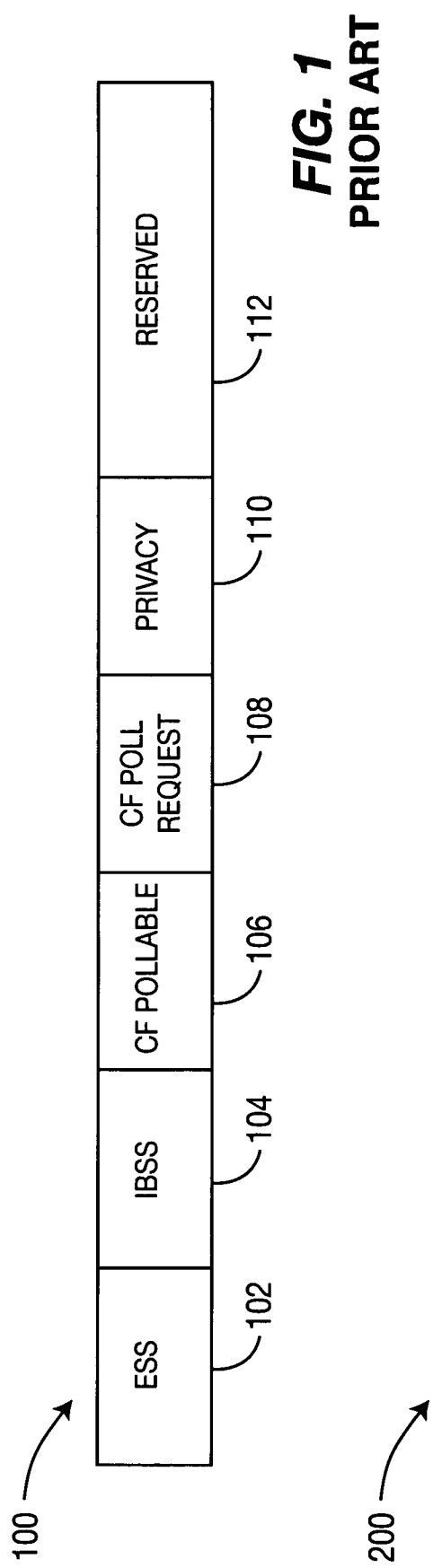
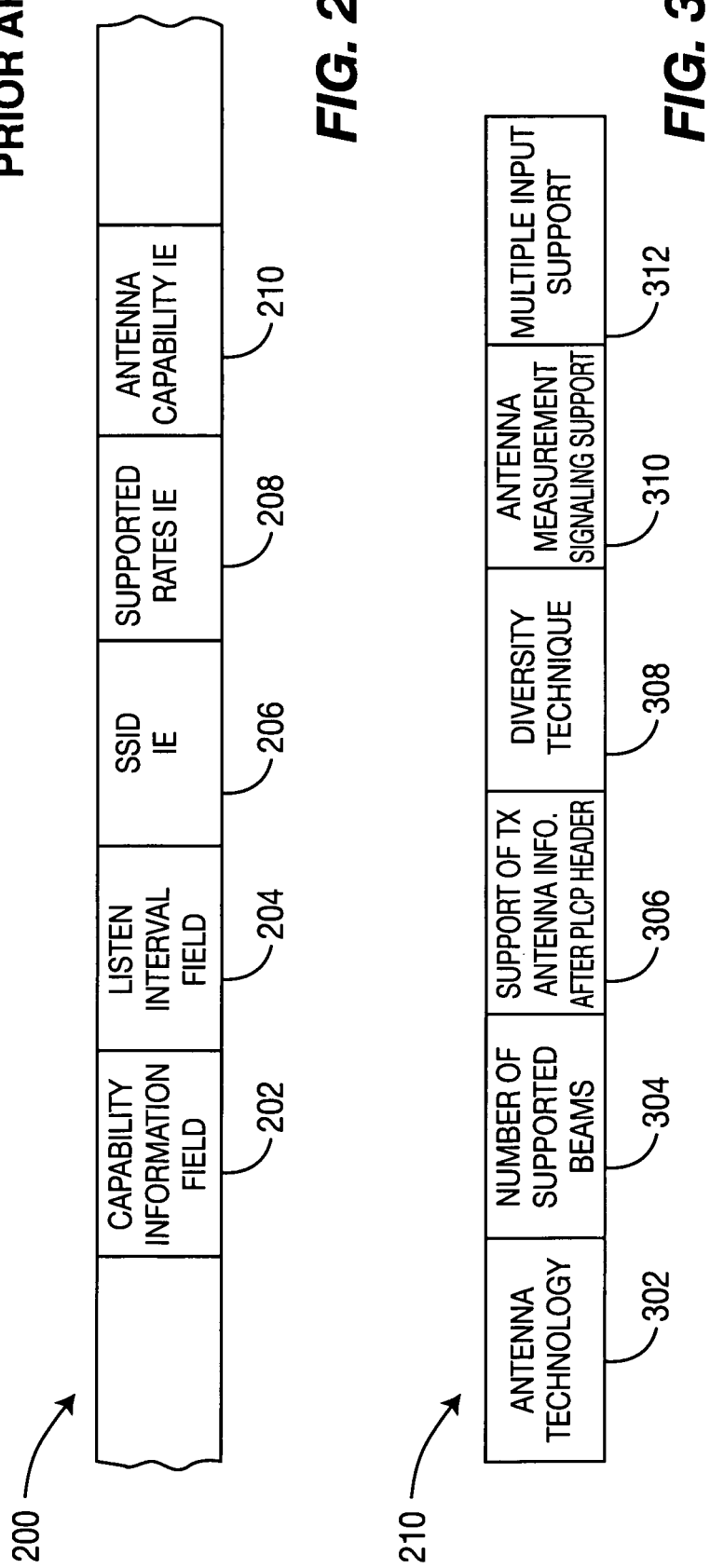

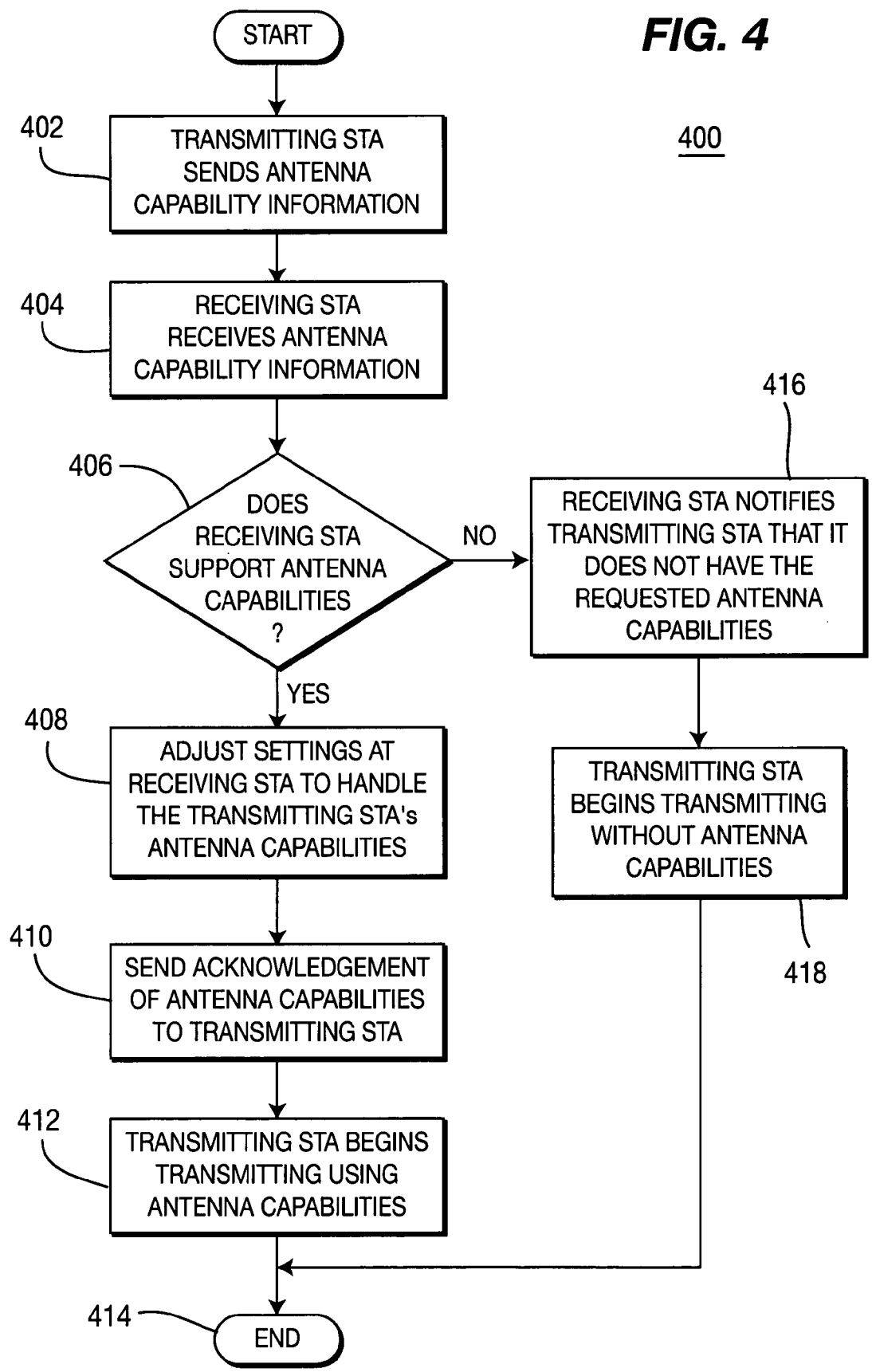

METHOD AND APPARATUS FOR TRANSFERRING SMART ANTENNA CAPABILITY INFORMATION

CROSS REFERENCE TO RELATED APPLICATION

This application claims the benefit of U.S. Provisional Application No. 60/609,132, filed Sep. 10, 2004, which is incorporated by reference as if fully set forth herein.

FIELD OF INVENTION

The present invention generally relates to a wireless local area network (WLAN) and, more particularly, to a method and apparatus for transferring smart antenna capability. The present invention can be implemented in an access point (AP) and a station (STA) to allow exchange of antenna capability information.

BACKGROUND

In a WLAN, smart antenna capabilities may exist at the AP, at the STA, or both. Without a prior exchange of antenna capability information, the AP does not know how to coordinate its smart antenna features with that of a STA and vice versa.

The potentially adverse affect on a WLAN by not exchanging smart antenna capability information can be illustrated in the following example. Suppose that switched-beam smart antennas are employed at both an AP and a STA and yet each end's smart antenna capabilities (for example, the number of beam modes that are available and need to be scanned, as well as time duration needed to test each of the available beams) are not known to the other end. Since neither the AP nor the STA know about the smart antenna capabilities of its receiving end, each will have to either: (1) make guesses as to the smart antenna capabilities of the other end; or (2) try to test its own transmit antenna beams without knowing that the receiving end might, at the same time, employ a beam search of its own.

If the smart antenna capabilities at both ends were known to each other, both devices could follow simple, pre-agreed rules to avoid service degradations due to beam searching at the same time on both ends. For example, if the "beam search time" ($T_{search}$) is known for both the AP and the STA, then a simple rule that could be useful might be that the device (the AP or the STA) that first receives a packet after association should wait for the duration of $T_{search}$ before it starts its own beam search, in an attempt to give the other end (which had initiated transmission) enough time to do its own beam search.

Current antenna technologies enhance reception by using receive and/or transmit diversity. These techniques either take longer to obtain any gain or provide less gain than otherwise would have been possible. Additionally, current antenna technologies often need to use proprietary messages to know the antenna capability of a STA. In the absence of this information, the APs and STAs cannot take advantage of antenna capabilities to increase the data rate or range.

For smart antenna features to work effectively, the information on the capabilities of the STA and the AP should be exchanged. Exchanging antenna information also allows possible coordination during optimization of smart antenna features such as beam selection, beam scanning, beam forming, multiple input multiple output (MIMO), and any other capability that allows changing the beam pattern and/or gain of the antennas.

SUMMARY

A system for exchanging smart antenna capability information between a transmitting STA and a receiving STA in a wireless communication system includes an antenna capability information element (IE). The antenna capability IE is sent from the transmitting STA to the receiving STA prior to data transmission between the transmitting STA and the receiving STA. When used in a WLAN, the antenna capability IE can be sent as part of a management frame.

A method for exchanging smart antenna capability information between a transmitting STA and a receiving STA in a wireless communication system includes the steps of: sending antenna capability information from the transmitting STA to the receiving STA, determining whether the receiving STA can support the antenna capabilities of the transmitting STA, adjusting settings at the receiving STA if the receiving STA can support the antenna capabilities of the transmitting STA, and transmitting data from the transmitting STA to the receiving STA using the antenna capabilities if the receiving STA can support the antenna capabilities of the transmitting STA.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 1 is a diagram of an existing capability information field;

FIG. 2 is a diagram of a portion of a frame including an antenna capability information element (IE) in accordance with the present invention;

FIG. 3 is a diagram of the antenna capability IE shown in FIG. 2;

FIG. 4 is a flowchart of a method in accordance with the present invention;

DETAILED DESCRIPTION OF THE PREFERRED EMBODIMENTS

Figure 5:
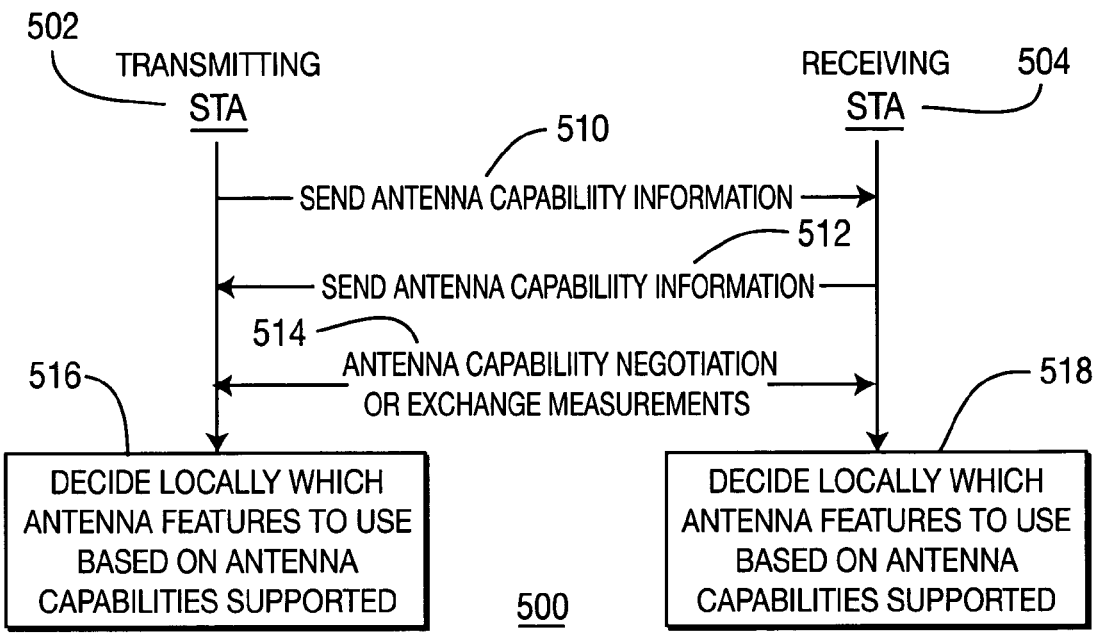
FIG. 5 is a flow diagram of an alternate method in accordance with the present invention.

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention addresses antenna capability information exchange between an AP and STA and builds upon the current messages provided by the 802.11 standards and is fully backward compatible.

A capability information field 100, as used in a beacon frame, an association request frame, an association response frame, and a probe response frame, has some reserved bits, as shown in FIG. 1. The capacity information field 100 includes an extended service set (ESS) subfield 102, an independent basic service set (IBSS) subfield 104, a contention free (CF)

pollable subfield 106, a CF poll request subfield 108, a privacy subfield 110, and a number of reserved bits 112. In the 802.11 standards, the subfields 102-110 are each one bit long and there are 11 reserved bits 112.

The present invention utilizes one of the reserved bits 112 for transferring antenna capability information by using one of the reserved bits as a flag to indicate whether antenna capability information will be transmitted. The details of an antenna's capabilities are part of an additional information element (IE), which is attached to the end of the packet if the antenna capability information flag is set.

The antenna capability information IE can be included as part of an association request frame, an association response frame, a probe request frame, and a probe response frame. An example of a portion of an association request frame 200 including this new IE is shown in FIG. 2. The frame 200 includes a capability information field 202, a listen interval field 204, a service set identifier (SSID) IE 206, a supported rates IE 208, and an antenna capability IE 210. Alternatively, the antenna capability IE 210 can be added to any management frame, such as a reassociation request, a reassociation response, or a beacon; to any control frame; or to data packets. In a preferred embodiment, the antenna capability IE 210 is sent in a management frame. If the antenna capability IE 210 is added to the probe request frame and the probe response frame, a STA can use this information before initiating an association procedure with an AP.

The antenna capability IE 210 is shown in detail in FIG. 3 and includes, but is not limited to, an antenna technology field 302, a number of supported beams field 304, a field to indicate support of transmit antenna information after physical (PHY) layer convergence protocol (PLCP) header 306, a diversity technique field 308, a field to indicate support of antenna measurement signaling 310, and a field to indicate support for multiple inputs 312. Additional antenna capability information may also be included in the IE 210.

In one embodiment, the minimum amount of information to be exchanged includes the antenna technology field 302, and the rest of the fields may be optional. It may be possible to derive the remaining fields (i.e., fields 304-312) once the antenna technology type is known.

After one side (either AP or STA) receives the antenna capability information from the transmitting side, the receiving side adjusts local settings for transmission and/or reception such as number of antennas used, diversity method, smart antenna technologies used for transmission/reception, and extra antenna measurements.

In the event that the receiving side cannot support the antenna capabilities of the transmitting side, the transmitting side will not be able to use the particular antenna features. Certain antenna technologies will operate properly only if both the transmitting side and the receiving side are capable of utilizing the technology. One example is MIMO technology, which only works if supported on both sides.

FIG. 4 shows a method 400 for exchanging antenna capability information in accordance with the present invention. For purposes of discussion of the method 400, the terms "transmitting STA" and "receiving STA" are used. It is noted that both the transmitting STA and the receiving STA can be an AP or a STA, such that an exchange of antenna capability information can occur between an AP and a STA or between two STAs, in either direction.

The method 400 begins with the transmitting STA sending its antenna capability information to the receiving STA in an antenna capability IE (step 402). The receiving STA receives the antenna capability IE (step 404) and determines whether it can support the requested antenna capabilities. If the receiving STA can support the antenna capabilities of the transmitting STA (step 406), then the receiving STA adjusts its settings to handle the transmitting STA's antenna capabilities (step 408). The receiving STA sends an acknowledgement of its antenna capabilities to the transmitting STA (step 410).

In an alternate embodiment of the method 400, the acknowledgement is sent to the transmitting STA before the receiving STA adjusts its settings (i.e., steps 408 and 410 are switched). While this message is an acknowledgement of the receiving STA's antenna capabilities, it is not necessarily an ACK signal. If the receiving STA has some, but not all, of the capabilities of the transmitting STA, negotiation of capabilities can occur to achieve a common set of capabilities to be used. If a preferred embodiment, the capabilities used will be the smaller capability set belonging to both STAs.

The transmitting STA begins transmitting using the communicated antenna capabilities (step 412) and the method terminates (step 414).

If the receiving STA does not support the transmitting STA's antenna capabilities (step 406), then the receiving STA notifies the transmitting STA that it does not have the requested antenna capabilities (step 416). The transmitting STA begins transmitting without using the requested antenna capabilities (step 418) and the method terminates (step 414).

FIG. 5 is a flow diagram of an alternate method 500 for exchanging antenna capability information between a transmitting STA 502 and a receiving STA 504. The transmitting STA 502 sends its antenna capability information to the receiving STA 504 (step 510). The receiving STA 504 sends its antenna capability information to the transmitting STA 502 (step 512). It is noted that steps 510 and 512 can be performed in reverse order. The ordering of steps 510 and 512 is not critical, as long as the antenna capability information is exchanged between the transmitting STA 502 and the receiving STA 504. Optionally, the transmitting STA 502 and the receiving STA 504 can negotiate antenna capabilities to find a common antenna capability set or can exchange measurement information (step 514). This optional step can be used to refine the set of antenna features to be used.

After the exchange of antenna information (steps 510, 512) and any additional information exchange (step 514), both the transmitting STA 502 and the receiving STA 504 decide locally which antenna features to use based on the antenna capabilities that are supported locally (steps 516, 518).

Figure 6:
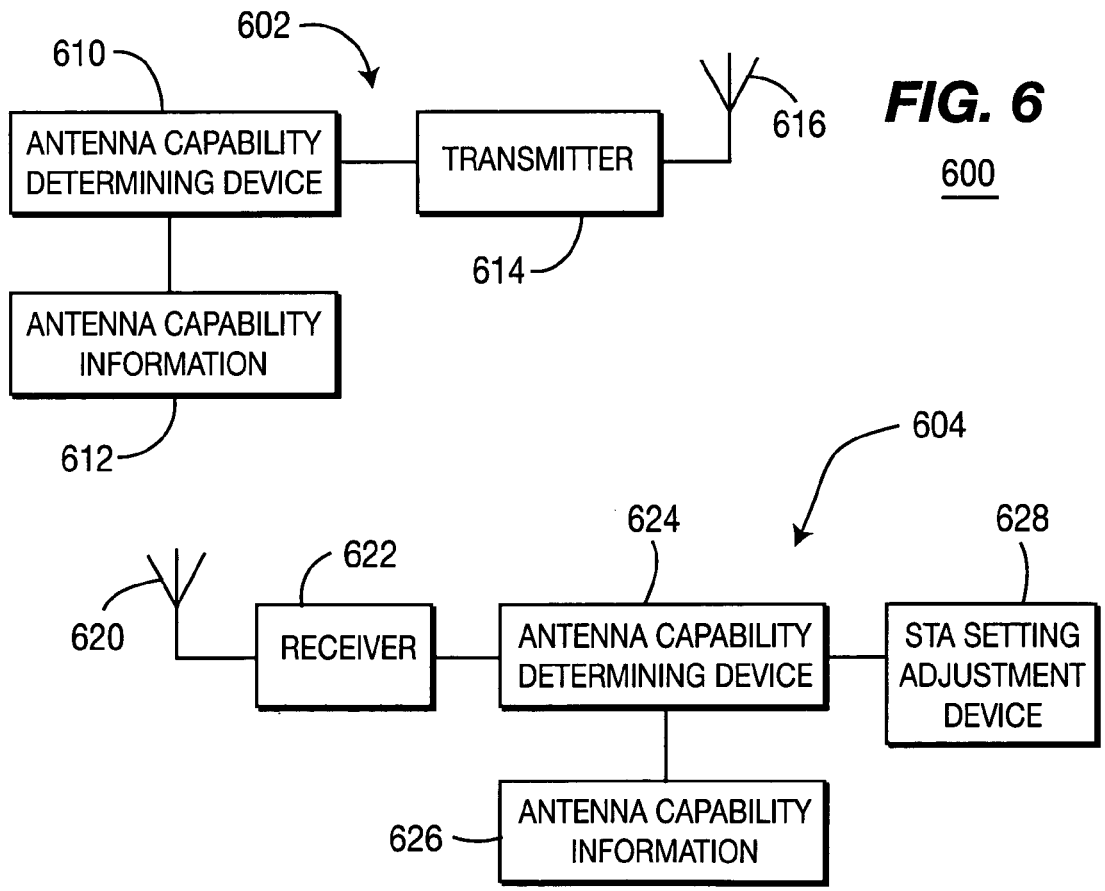
FIG. 6 is a block diagram of a system constructed in accordance with the present invention.

FIG. 6 is a block diagram of a system 600 constructed in accordance with the present invention. The system 600 includes a transmitting STA 602 and a receiving STA 604. The transmitting STA 602 includes an antenna capability determining device 610 which determines the antenna capabilities of the transmitting STA 602 by examining stored antenna capability information 612. The antenna capabilities of the transmitting STA 602 are sent out by a transmitted 614 and an antenna 616.

The receiving STA 604 receives the antenna capability information of the transmitting STA 602 via an antenna 620 and a receiver 622. An antenna capability determining device 624 compares the antenna capabilities of the transmitting station 602 with the antenna capability information 626 of the receiving STA 604. The antenna capability determining device 624 communicates with a STA setting adjustment device 628, which adjusts the settings of the receiving STA 604 in order to utilize the smart antenna capabilities.

It is noted that a negotiation of antenna capabilities between the transmitting STA 602 and the receiving STA 604 can occur via the respective antenna capability determining devices 610, 624.

While the present invention has been described in terms of a WLAN, the principles of the present invention are equally applicable to any type of wireless communication system. Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A first station (STA) for exchanging antenna capability information in wireless communications, the first STA comprising:
   a receiver configured to receive a probe request frame that contains an antenna capability information element that indicates a plurality of antenna capabilities of a second STA;
   a processor configured to determine whether the first STA supports at least one of the indicated plurality of antenna capabilities; and
   a transmitter configured to transmit a probe response frame that contains a second antenna capability information element that indicates a plurality of antenna capabilities of the first STA.

2. The first STA according to claim 1, wherein the first STA is a wireless local area network (WLAN) access point.

3. The first STA according to claim 1, wherein the first STA is a STA in a wireless local area network (WLAN).

4. The first STA according to claim 1, wherein the first or the second antenna capability information element includes an antenna technology field.

5. The first STA according to claim 1, wherein the first or the second antenna capability information element further includes at least one field selected from the group consisting of a number of supported beams, an indicator of support of transmit antenna information after physical layer convergence protocol header, an indicator of diversity technique, an indicator of antenna measurement signaling support, and an indicator of multiple input support.

6. The first STA according to claim 5, wherein each of the at least one fields is derived by the second STA from the antenna technology field.

7. The first STA according to claim 1, wherein the probe response frame is transmitted at any time after association between the first STA and the second STA.

8. The first STA according to claim 1, wherein the probe response frame is transmitted at any time after a data transfer between the STA and the second STA.

9. The first STA of claim 1, wherein the processor is further configured to adjust antenna settings of the first STA to use a set of antenna capabilities belonging to both the first and second STAs on a condition that the first STA supports at least one of the indicated plurality of antenna capabilities.

10. A method for exchanging antenna capability information at a first station (STA) in wireless communications, the method comprising:
    receiving a probe request frame that contains an antenna capability information element that indicates a plurality of antenna capabilities of a second STA;
    determining whether the first STA can support at least one of the indicated plurality of antenna capabilities of the second STA; and
    transmitting a probe response frame that contains a second antenna capability information element that indicates a plurality of antenna capabilities of the first STA.

11. The method according to claim 10, wherein the replying is performed prior to the adjusting.

12. The method according to claim 10, wherein the replying is performed after the adjusting.

13. The method according to claim 10, wherein the replying includes notifying the transmitting STA that the receiving STA does not have the requested antenna capabilities.

14. The method according to claim 10, wherein the receiving includes receiving data from the transmitting STA using a different antenna capability than the plurality of indicated antenna capabilities.

15. The method according to claim 10, wherein the adjusting includes adjusting at least one setting selected from the group consisting of a number of antennas used, a diversity method, a smart antenna technology used, and additional antenna measurements.

16. The method of claim 10, further comprising: adjusting settings at the first STA to use a set of antenna capabilities belonging to both the first and second STAs on a condition that the first STA can support at least one of the indicated plurality of antenna capabilities of the second STA.

17. A method for exchanging smart antenna capability information at a first station (STA) in wireless communications, the method comprising:
    transmitting a probe request frame containing antenna capability information relating to the antenna capability of the first STA, prior to data transmission with a second STA;
    receiving a probe response frame containing antenna capability information relating to the antenna capability of the second STA; and
    determining which antenna capabilities to use for future transmission and reception.

18. The method according to claim 16, wherein the deciding is performed without any additional communication.

19. The method according to claim 16, further comprising: exchanging measurement information with the second STA, the exchanging being performed prior to the deciding.

20. The method according to claim 16, further comprising: negotiating antenna capability information with the second STA, the negotiating being performed prior to the deciding.

21. A first station (STA) for exchanging antenna capability information in wireless communications, the first STA comprising:
    a transmitter configured to transmit a probe request frame that contains antenna capability information relating to the antenna capability of the first STA, prior to data transmission with a second STA;
    a receiver configured to receive a probe response frame that contains antenna capability information relating to the antenna capability of the second STA; and
    a processor configured to determine which antenna capabilities to use for future transmission and reception.

22. The first STA according to claim 20, wherein the processor is configured to decide which antenna capabilities to use for future transmission and reception without any additional communication.

23. The first STA according to claim 20, wherein the processor is configured to exchange measurement information with the second STA before it decides which antenna capabilities to use for future transmission and reception.

24. The first STA according to claim 20, wherein the processor is configured to negotiate antenna capability information with the second STA before it decides which antenna capabilities to use for future transmission and reception.

* * * * *

UNITED STATES PATENT AND TRADEMARK OFFICE
CERTIFICATE OF CORRECTION

| | | |
|---|---|---|
| PATENT NO. | : 8,504,110 B2 | Page 1 of 1 |
| APPLICATION NO. | : 11/066915 | |
| DATED | : August 6, 2013 | |
| INVENTOR(S) | : Chandra et al. | |

It is certified that error appears in the above-identified patent and that said Letters Patent is hereby corrected as shown below:

IN THE CLAIMS

At column 5, line 46, after the word "the", insert therefor --first--. (first occurrence)

Signed and Sealed this
First Day of March, 2016

Michelle K. Lee
*Director of the United States Patent and Trademark Office*